United States Patent [19]

Ellens

[11] 4,208,778

[45] Jun. 24, 1980

[54] METHOD FOR FABRICATING A SEAT BELT ASSEMBLY CONNECTION

[76] Inventor: Gordon A. Ellens, 4262 Greenvale, S.W., Grand Rapids, Mich. 49509

[21] Appl. No.: 967,479

[22] Filed: Dec. 7, 1978

Related U.S. Application Data

[62] Division of Ser. No. 733,757, Oct. 19, 1976, Pat. No. 4,141,573.

[51] Int. Cl.² .............................................. B23P 17/00
[52] U.S. Cl. ....................................... 29/423; 29/458; 29/460; 29/463; 29/526 R; 264/263; 264/271; 264/334; 427/435
[58] Field of Search ...................... 29/526 R, 423, 463, 29/458, 460; 427/435; 264/263, 271, 334; 280/744, 801; 297/482

[56] References Cited

U.S. PATENT DOCUMENTS

| | | | |
|---|---|---|---|
| 3,012,315 | 12/1961 | Stillwagon, Jr. .................... | 29/423 |
| 3,025,635 | 3/1962 | Walters et al. .................. | 264/334 X |
| 3,305,266 | 2/1967 | Nicholas et al. ..................... | 297/482 |
| 3,707,033 | 12/1972 | Knott .............................. | 427/435 X |
| 3,725,995 | 4/1973 | Sharp et al. ........................ | 29/458 X |
| 4,070,038 | 1/1978 | Bergman et al. .................... | 297/482 |

*Primary Examiner*—Charlie T. Moon
*Attorney, Agent, or Firm*—Price, Heneveld, Huizenga & Cooper

[57] ABSTRACT

The specification discloses a seat belt assembly having a plastic encapsulated, molded in place steel strap and a method for fabricating by vinyl dip-molding. Fabrication of the assembly includes forming an elongated, flattened structural member having a hole for connecting the structural member to a vehicle, securing a spacing block over the hole of the structural member and dip molding a resilient coating generally over the entire assembly. The coating is cut on three sides of the blocks to form a moveable, cupped flap permitting removal of the spacing block and exposing the hole so a coupling means can pass through the hole thereby connecting the seat belt assembly to the vehicle. After connection, the flap is returned to its original position encapsulating the structural member so the hole and coupling means are covered.

10 Claims, 6 Drawing Figures

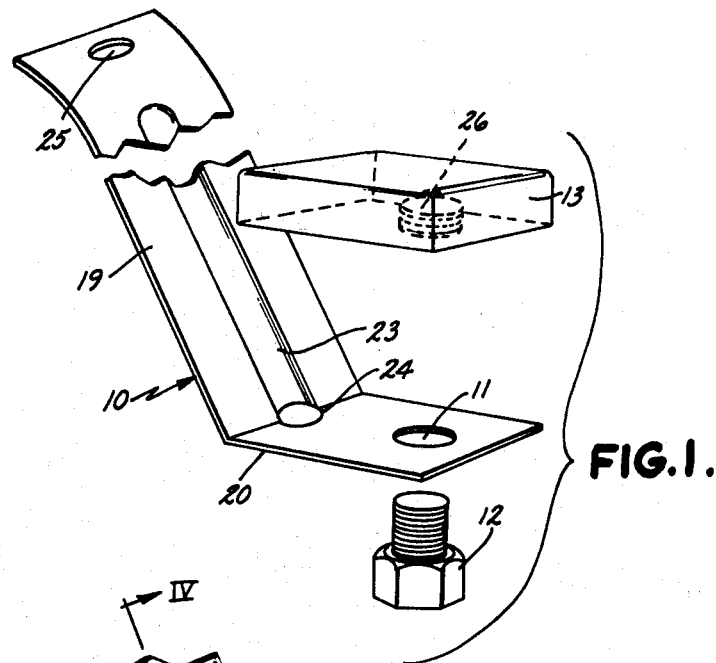
FIG. 1.
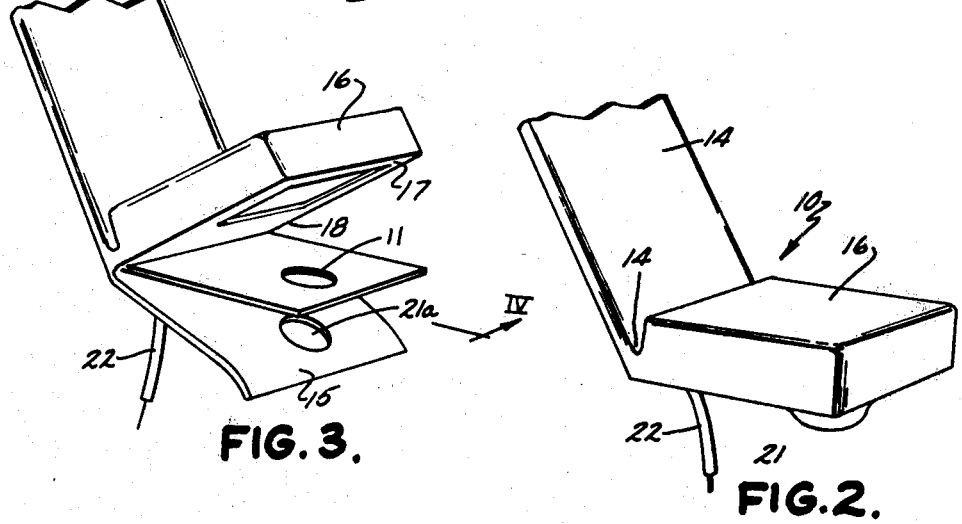
FIG. 3.
FIG. 2.
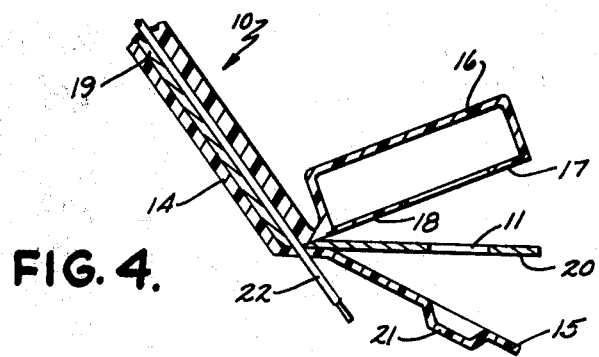
FIG. 4.

METHOD FOR FABRICATING A SEAT BELT ASSEMBLY CONNECTION

This is a division of application Ser. No. 733,757, filed Oct. 19, 1976, now U.S. Pat. No. 4,141,573, issued Feb. 27, 1979.

BACKGROUND OF THE INVENTION

This invention relates to vehicle occupant restraining means; and, more particularly, to a vehicle seat belt assembly and method for fabricating.

One type of automobile seat belt assembly used today has a molded, hollow housing for passing a fabric seat belt to a metal link which is secured by a bolt to the floor of the automobile. The assembly of such a structure requires coupling the seat belt to the metal link and threading of the seat belt through the housing. In view of the large number of automobiles produced, it can be appreciated that even a relatively simple step such as threading the seat belt can have a substantial total cost to an automobile manufacturing company. Additionally, the hollow housing is typically not secured to either the vehicle or the seat belt and can slide along the seat belt thereby exposing the safety belt, the metal link and the bolt securing the metal link to the floor.

Some have avoided this problem by taking a steel cable like member and encapsulating it with a plastic coating, probably by dipping it into molten plastic. However, such coated cables do not have the rich luxurious look of a conventional dip molded plastic seat belt housing. Also, the end of the cable must be anchored to the vehicle and this anchoring is of course visible since it is effected after the plastic coating operation.

SUMMARY OF THE INVENTION

In the present invention, the separate fabric seat belt, the separate hollow housing and the threading of the belt into the housing are all eliminated. Yet the present invention has the rich completely covered look afforded by conventional molded housings.

The present invention comprises a metal strap, encapsulated by molding in place, yet including a preferably somewhat cup-shaped cover flap at the end of the metal strap which can be lifted to allow one to secure the anchor end of the strap to the vehicle and which then lays down over the anchoring to cover it. The metal strap of the present invention has a first end for coupling to a seat belt buckle or latch and a second or anchor end having an opening for coupling the metal strap to the vehicle. A coating covers and adheres to almost the entire strap except for the moveable flap which lifts to reveal the second end opening and lowers to cover the opening once coupling means have been passed through the opening to secure the seat belt assembly to the vehicle.

The method of fabricating the seat belt assembly of the present invention includes forming an elongated, flat metal strap with an angled, integral end flange having an opening therethrough. A spacing block is connected to the end flange so the opening and a portion of the end flange are covered. This assembly is coated with a resilient plastic material to form a sheath around the metal strap. A cut in the coating is made around the periphery of a portion of the end flange and the coating is spread along the cut so the spacing block can be removed from within the coating. After the spacing block is removed, the coating includes a moveable cupped flap, having a concave recess the size of the removed spacing block, which can be used to cover the opening and any coupling means passed through the opening when the seat belt assembly is connected to the vehicle.

The sheath around the metal strap adheres to and does not slip with respect to the strap. Since the moveable flap is integrally molded with the sheath portion, the intersection of the moveable flap and the remainder of the coating is fixed with respect to the metal strap and prevents the flap from slipping along the strap.

BRIEF DESCRIPTIONS OF THE DRAWINGS

FIG. 1 is an exploded frontal perspective view of a partially completed seat belt assembly, prior to encapsulation, in accordance with an embodiment of this invention;

FIG. 2 is a fragmentary frontal perspective view of a seat belt assembly in accordance with an embodiment of this invention;

FIG. 3 is a fragmentary frontal perspective view of a seat belt assembly, prior to installation, in accordance with an embodiment of this invention;

FIG. 4 is a cross section view along section line IV—IV of FIG. 3 of a seat belt assembly in accordance with an embodiment of this invention;

DETAILED DESCRIPTION

Figure 5:
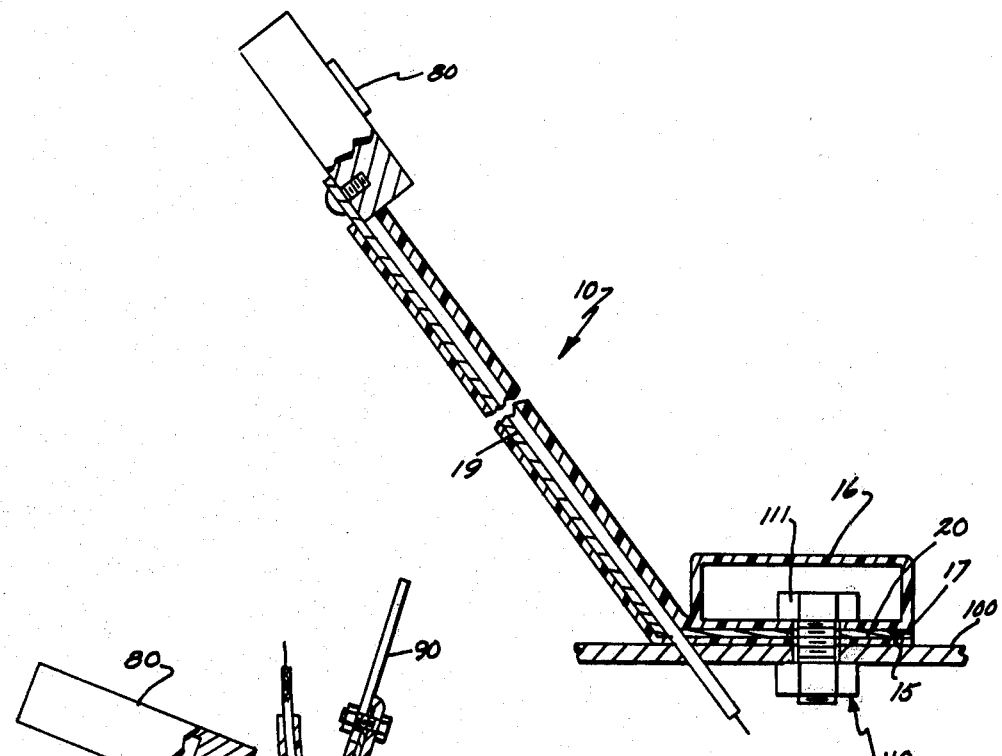
FIG. 5 is a broken cross-sectional view of the seat belt assembly secured to the floor of an automobile.

Referring to the drawings, the seat belt assembly 10 has a flat, elongated metal strap 19 and an integral, flat, elongated anchor flange 20 bent at an angle to metal strap 19 (FIG. 1). Metal strap 19 and anchor flange 20 provide structural support for seat belt assembly 10 and are typically formed of a metal such as steel or a material of similar strength and of sufficient heat resistance to withstand, without deteriorating, the heat of a molding operation. Anchor flange 20 has an opening 11 formed completely through and perpendicular to the flat sides of anchor flange 20. Opening 11 is used both during fabrication of seat belt assembly 10 and for securing seat belt assembly 10 to a vehicle by coupling means such as a bolt. For some applications it is advantageous that metal strap 19 have a recessed channel 23 running longitudinally to a channel opening 24 through metal strap 19 at the edge of anchor flange 20. A conductor 22 is placed longitudinally in channel 23 for carrying electrical signals indicating, for example, when a seat belt is buckled or unbuckled. Metal strap 19 also has a mounting opening 23 formed therethrough at the extremity opposite from anchor flange 20 for mounting, for example, a seat belt latch or a seat belt buckle.

A plastic coating on the assembly 10 defines a sheath 14 completely surrounding and adhering to all parts of metal strap 19 except for anchor flange 20 which is bounded by an integral upper flap 16 and an integral lower flap 15 deformably hinged to the sheath portion 14 of the coating at the junction of anchor flange 20 and the remainder of metal strap 19. Preferably, the plastic coating, especially sheath portion 14, is of sufficient thickness to give assembly 10 a somewhat resilient feeling to the touch. An appropriate plastic to use is polyvinyl chloride, preferably of 60 to about 90 Shore A durometer hardness. Upper flap 16 is typically large enough to cover anchor flange 20 and has a recessed, cupped interior with a concave portion which is sufficiently deep to receive the head of a bolt which can pass through opening 11 to secure seat belt assembly 10 to a vehicle. Advantageously, upper flap 16 has a flange 17 surrounding the periphery of the concave opening of upper flap 16 where it is not hingedly connected to sheath 14. Flange 17 can be forced down over anchor flange 20 and thereby engage the underside periphery of anchor flange 20 and prevent lifting of upper flap 16.

Lower flap 15 is also integrally and flexibly hinged to the remainder of coating 14 around anchor body 19 and covers the underside of anchor flange 20 with the exception of the portion, if any, covered by flange 17. A bolt through opening 11 connecting assembly 10 to the floor of a vehicle can pass through an opening 21a (FIG. 3) in lower flap 15 made by cutting away indentation 21 (FIG. 4). Lower flap 15 acts as a cushion between the vehicle and anchor flange 20. Alternatively, if desired, lower flap 15 can be removed and anchor flange 20 can rest directly on a vehicle surface such as the floor.

FIG. 5 shows the belt assembly 10 secured to the floor 100 of a vehicle by bolt assembly 110. This Figure is illustrative only and is not necessarily intended to accurately depict any particular vehicle mounting system. It does illustrate, however, the manner in which flange 17 of cup flap 16 slips under anchor flange 20. It also illustrates the manner in which flap 16 covers the head of bolt 111 of bolt assembly 110 and the manner in which flap 15 fits between anchor flange 20 and the vehicle floor 100. Latch 80 is secured to the end of metal strap 19 by rivets or the like.

FABRICATION

A seat belt assembly 10, in accordance with an embodiment of this invention, is fabricated by forming an elongated, flattened piece of metal. One end of the elongated piece having formed therethrough opening 25 and being adapted for connection to a seat belt buckle or latch and the other end of the elongated piece having formed therethrough opening 11 and being adapted for connection to the floor of a vehicle. A bend is made in the elongated piece to form anchor flange 20 so flange 20 can lie horizontally on the floor of a vehicle and the remainder of metal strap 19 can angle upward alongside or through a vehicle seat.

In preparation for forming a coating on metal strap 19, a spacing block 13 is connected to anchor flange 20 by a bolt 12 extending through opening 11. Spacing block 13 is a generally rectangular block and is approximately the same size as anchor flange 20. Spacing block 13 contains a cylindrical opening 26, advantageously aligned with opening 11, having internal threads for receiving bolt 12. After bolt 12 and block 13 are connected, they are coated with a release agent, such as Teflon, so material coated on block 13 and bolt 12 can be easily removed. Additionally, it is advantageous to coat anchor flange 20 with a release agent, but the remainder of metal strap 19 is not coated so coating portion 14 adheres thereto. That portion of the plastic coating which adheres to the main body of strap 19 is referred to as a sheath 14 while the lower portions 15 and 16 of the plastic coating are referred to as flaps.

The assembly of metal strap 19, including anchor flange 20, bolt 12 and block 13 is dipped into vinyl dip molding material to form the coating. Alternatively, the coating can be formed by injection molding. In such an operation, the assembled metal strap 19, bolt 12 and block 13 would be placed in an injection mold and a coating injected thereabout. A typical material is a resilient heat formable plastic. The coating around anchor flange 20 is slit along a horizontal line around the entire perimeter of anchor flange 20 except where anchor flange 20 joins the remainder of metal strap 19. Accordingly, the coating around anchor flange 20 is split into upper flap 16 and lower flap 15. Advantageously, the cut into the coating forming lower flap 15 and upper flap 16 is done along the bottom surface of anchor flange 20 and spaced somewhat inward from the perimeter. This is done so upper flap 16 includes a flange 17 around the perimeter where the coating is cut. Flange 17 is useful to engage anchor flange 20 when anchor assembly 10 is mounted so that upper flap 16 remains secured to anchor flange 20 and thus covers the bolt through openings 11 securing anchor assembly 10 to the vehicle.

As noted, the main strap body 19 is not coated with a release agent before molding so coating thereon, i.e. sheath 14, adheres to main strap body 19 and does not slip. Accordingly, upper flap 16 is integrally hinged to a relatively fixed portion of coating, i.e. sheath 14, and thus is secured to metal strap 19 around its entire perimeter by either the hinge or flange 17. Indentation 21 is formed in lower flap 15 by the head of bolt 12 during molding. This is cut away to leave hole 21a. Also, some of the coating material may have flowed into a peripheral space between block 13 and anchor flange 20 thereby forming a flashing 18 (shown in FIGS. 3 and 4) around the periphery of the interior of upper flap 16. If desired, flashing 18 can be removed.

Figure 6:
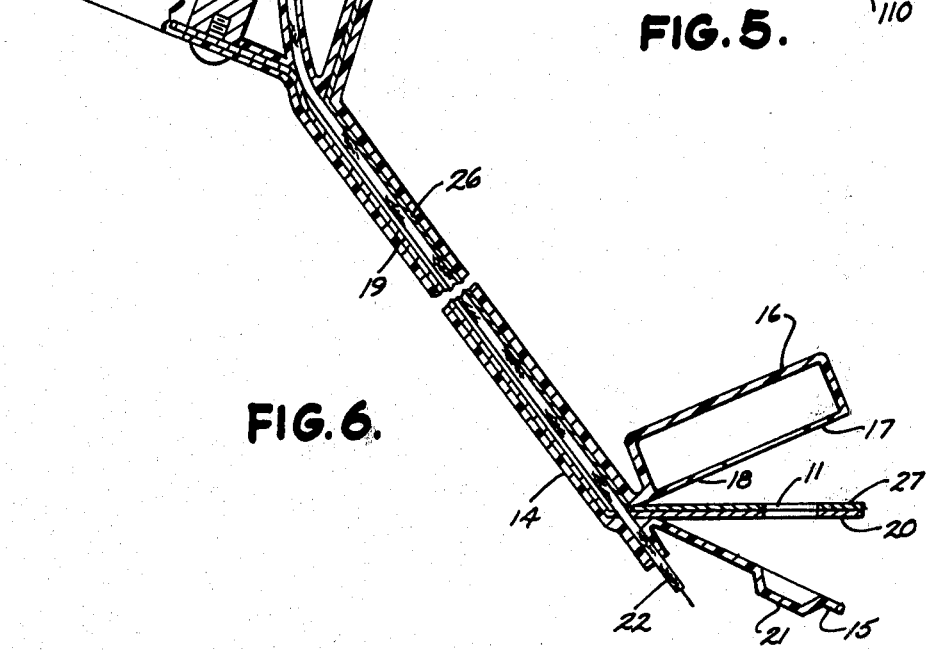
FIG. 6 is a cross section view, similar to FIG. 4, of a seat belt assembly in accordance with another embodiment of this invention.

Referring to FIG. 4, an embodiment of this invention includes a conductor 22 placed in channel 23 in metal strap 19 before molding. Coating sheath 14 surrounds wire 22 and secures it to anchor body 19. Additionally, as shown in FIG. 6, an elongated, flattened metal cover strap 26, is adapted to align with metal strap 19 and anchor flange 20. Advantageously, metal cover strap 26 is spot welded to metal strap 19, covers recessed channel 23 and has an opening which aligns with opening 11. The opposite extremity of metal cover strap 26 from opening 11 is angled from metal strap 19 to provide another mounting location for a seat belt buckle 90 or latch 80. As shown, buckle 90 is secured to strap 26 and buckle 80 is secured to strap 19. If metal cover strap 26 is included, spacing block is positioned on metal cover strap 26 and bolt 12 passed through the openings in both metal cover strap 26 and metal strap 19.

Various modifications will no doubt occur to those skilled in the art to which this invention pertains. For example, the shape of the spacing block and the coupling of the spacing block to the anchor flange may be varied from that disclosed herein. These and all other variations which basically rely on the teachings by which this disclosure has advanced the art are properly considered within the scope of this invention.

I claim:
1. A method of fabricating a seat belt assembly comprising the steps of:
  forming a metal strap, having an elongated generally flat body with an integral end anchor flange portion including an opening adapted to pass coupling means for coupling said metal strap to a vehicle;
  coupling a spacing block to said end anchor flange for covering said opening and at least a portion of said end anchor flange;

coating said metal strap and spacing block with a resilient material;

cutting said coating around a portion of the periphery of said end anchor flange thereby forming a moveable flap integrally coupled by a deformable hinge to the remainder of said coating;

flexing said flap to move said flap and expose said spacing block; and removing said spacing block from contact with said metal strap anchor flange and coating.

2. A method of fabricating a seat belt assembly as recited in claim 1 wherein said step of coating said metal strap includes the step of first coating said spacing block and end anchor flange with a release agent to prevent said resilient material from sticking to said spacing block or end anchor flange.

3. The method of claim 2 wherein said coating step is effected by a vinyl dip molding method.

4. A method of fabricating a seat belt assembly as recited in claim 2 wherein said cutting said coating includes the step of forming a cut into said coating on the underside of said end flange, opposite from the upperside coupled to said spacing block, thereby leaving covering material between the surface of said end flange and said spacing block and forming a peripheral flange around said flap, for releasably coupling to said end flange.

5. A method of fabricating a seat belt assembly as recited in claim 4 wherein coupling said spacing block includes the steps of:

passing a mounting means partially through said opening;

aligning a receiving means in said spacing block with said mounting means; and securing said mounting means to said receiving means thereby securing said spacing block to said metal strap.

6. A method of fabricating a seat belt assembly as recited in claim 5 wherein the step of forming a metal strap includes the steps of:

forming a longitudinal recessed channel in said metal strap;

forming a metal cover strap, having an elongated, generally flat cover body with an angled, integral end cover flange with a cover opening adapted to pass said coupling means; and coupling said metal cover strap to said metal strap thereby covering said recessed channel.

7. The method of claim 5 wherein said coating step is effected by a vinyl dip molding method.

8. A method of fabricating a seat belt assembly comprising the steps of:

forming a metal strap, having an elongated, generally flat body with an angled, integral end flange having an opening adapted to pass coupling means for coupling said metal strap to a vehicle;

passing a mounting means partially through said opening;

positioning a spacing block having a receiving means for said mounting means on said flange;

aligning said receiving means with said mounting means;

securing said mounting means to said receiving means thereby securing said spacing block to said end flange;

coating said spacing block with a release agent to prevent a resilient material from sticking to said spacing block;

encapsulating said metal strap and spacing block with a resilient material, thereby forming a coating around said end flange and spacing block;

cutting said coating around a portion of the periphery of said end flange thereby forming an integral moveable flap deformably hinged to the reminder of said coating;

flexing said flap to move said flap and to expose said spacing block; and removing said spacing block from contact with said metal strap and said coating.

9. The method of claim 8 wherein said coating step is effected by a vinyl dip molding method.

10. A method of fabricating a seat belt assembly as recited in claim 8 further comprising the steps of:

forming a longitudinal recessed channel in said metal strap for receiving a conductor means;

forming a metal cover strap, having an elongated, generally flat cover body with an angled, integral end cover flange with a cover opening adapted to pass said coupling means; and coupling said metal cover strap to said metal strap thereby covering said recessed channel.

* * * * *